W. E. CONNELLY.
Hill-Side Plow.

No. 213,095.    Patented Mar. 11, 1879.

Witnesses.
A. Ruppert,
James N. Lange.

Inventor:
William E. Connelly,
per Edson Bros.
Attorneys.

UNITED STATES PATENT OFFICE.

WILLIAM E. CONNELLY, OF WEDOWEE, ALABAMA.

IMPROVEMENT IN HILL-SIDE PLOWS.

Specification forming part of Letters Patent No. 213,095, dated March 11, 1879; application filed December 26, 1878.

*To all whom it may concern:*

Be it known that I, WILLIAM E. CONNELLY, of Wedowee, in the county of Randolph and State of Alabama, have invented certain new and useful Improvements in Hill-Side Plows; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1:
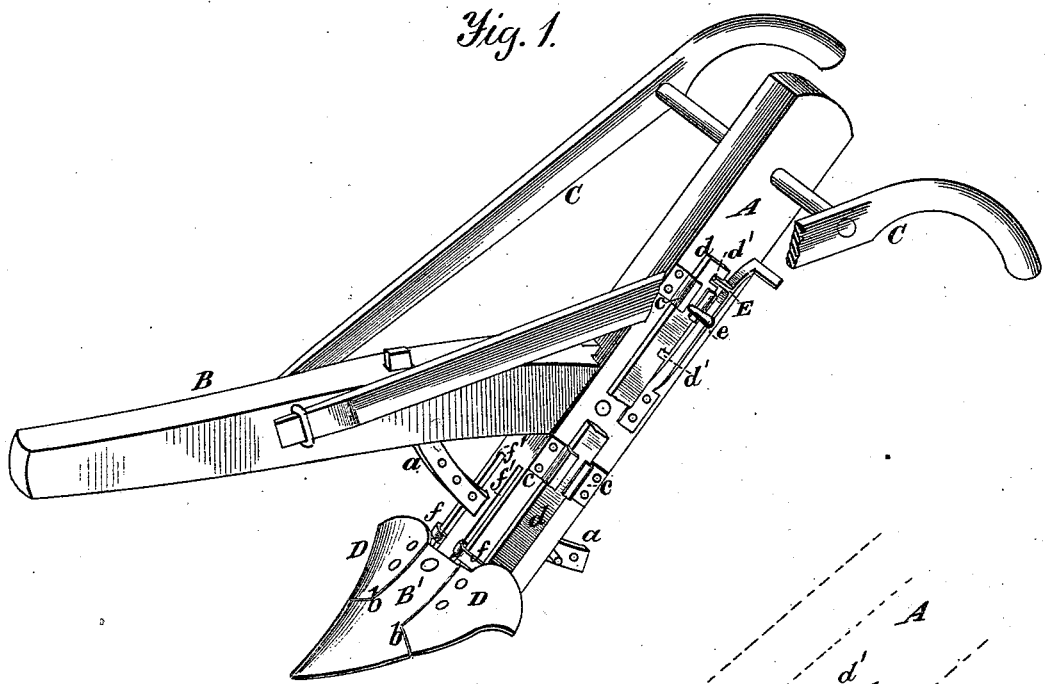
Figure 2:
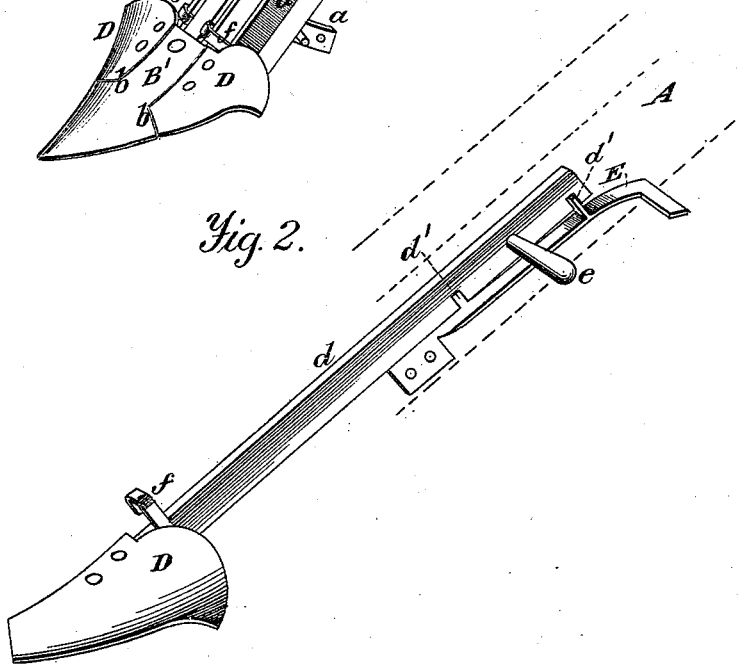

Figure 1 is a perspective view of my improved plow, and Fig. 2 is a detailed perspective view of the same.

The same part in the two figures is denoted by the same letter.

This invention relates to certain improvements in plows of that class operated by hand; and it consists in its adaptation for either hill-side or other plowing, substantially as hereinafter described, and particularly pointed out in the claim.

In the accompanying drawings, A refers to the stock, B to the beam, and C C to the handles, of what is termed a "walking-plow." The beam is pivoted in a slot in the stock A, and connected adjustably by the grass-blade $a$ to the same, by which it may be raised or lowered to accommodate shallow or deep plowing.

To the lower end of the stock A is attached the shovel or plow B', with its upper edges recessed, as at $b$, to provide for the adjustment thereto of wings or mold-boards, as shown in Fig. 1, forming detachable continuations of the shovel or plow proper B'.

D D are two wings or mold-boards, fastened to the lower ends of vertically-sliding bars $d$ $d$, confined one upon each side of the stock A, so as to permit of their being raised or lowered by hand, by means of staples or clips $c\,c$, fastened to said stock in any suitable way. The rear edges of these bars $d\,d$ are provided with notches $d'\,d'$, with which engage toothed spring-catches E, fastened to the sides of the stock A, in rear of the bars $d$, as clearly shown in Fig. 1.

The upper ends of the bars $d$ are provided with handles or projections $e\,e$, by which they may be raised or lowered, as occasion may require.

The lower ends of the bars $d$ are provided, just above the wings or mold-boards D, with headed hooks or clips $f$, with their headed or free ends let into grooves $f'$ in the front side of the stock, as clearly seen in Fig. 1, to strengthen and aid in guiding those ends of the sliding bars $d$ as they are vertically adjusted.

The operation is as follows: In the event it is desired to plow on a hill-side or in hilly country, with the slope to the right, the plow or shovel being in position for work, the wing or mold-board upon the left is elevated by first disengaging the spring-catch from and lifting the bar having the said wing, and then lowering the wing or mold-board on the right, when the plow is ready for work.

To plow in the reverse direction, or with the slope to the left, a vice-versa course is pursued to that above laid out.

This plow is also equally adapted for ordinary plowing, or plowing in even land.

Having thus fully described my invention, I claim and desire to secure by Letters Patent—

The stock A of a plow, having secured thereto the spring-catch E, clips $c$, and a groove, $f'$, in combination with the vertically-sliding bars $d$, having hooks $f$, substantially as shown and described.

In testimony that I claim the foregoing as my own I hereunto affix my signature in presence of two witnesses.

WILLIAM E. CONNELLY.

Witnesses:
ROBERT WEST,
WILLIAM P. CONNELLY.